(12) United States Patent
Kim

(10) Patent No.: US 12,299,242 B2
(45) Date of Patent: May 13, 2025

(54) TOUCH DISPLAY DEVICE AND TOUCH POWER SIGNAL GENERATION CIRCUIT

(71) Applicant: LG Display Co., Ltd., Seoul (KR)

(72) Inventor: HoonBae Kim, Seoul (KR)

(73) Assignee: LG Display Co., Ltd. (KR)

(*) Notice: Subject to any disclaimer, the term of this patent is extended or adjusted under 35 U.S.C. 154(b) by 0 days.

(21) Appl. No.: 18/517,381

(22) Filed: Nov. 22, 2023

(65) Prior Publication Data

US 2024/0211078 A1 Jun. 27, 2024

(30) Foreign Application Priority Data

Dec. 26, 2022 (KR) .................. 10-2022-0184482

(51) Int. Cl.
G06F 3/044 (2006.01)
G06F 3/041 (2006.01)
G09G 3/3233 (2016.01)

(52) U.S. Cl.
CPC ............ G06F 3/044 (2013.01); G06F 3/0412 (2013.01); G06F 3/04166 (2019.05); G06F 3/04184 (2019.05); G09G 3/3233 (2013.01); G09G 2310/08 (2013.01); G09G 2330/021 (2013.01); G09G 2354/00 (2013.01)

(58) Field of Classification Search
CPC ........ G06F 3/044–0448; G06F 3/0416–04186; G06F 3/0412
See application file for complete search history.

(56) References Cited

U.S. PATENT DOCUMENTS

| | | | | |
|---|---|---|---|---|
| 9,245,490 B1* | 1/2016 | Cho | ...................... | G06F 3/0443 |
| 9,665,208 B2* | 5/2017 | Kim | ...................... | G06F 3/0443 |
| 9,760,213 B2* | 9/2017 | Kim | ...................... | G06F 3/0412 |
| 10,019,088 B2* | 7/2018 | Kim | ...................... | G06F 3/0412 |
| 10,185,421 B2* | 1/2019 | Kim | ...................... | G06F 3/047 |
| 10,275,089 B2* | 4/2019 | Kim | ...................... | G06F 3/0443 |
| 10,324,324 B2* | 6/2019 | Kim | ...................... | G06F 3/0412 |
| 10,775,924 B2* | 9/2020 | Shin | ...................... | G06F 3/044 |
| 10,802,654 B2* | 10/2020 | Jun | ...................... | G06F 3/0418 |
| 10,996,791 B2* | 5/2021 | Kim | ...................... | G09G 3/2092 |
| 11,003,278 B2* | 5/2021 | Kim | ...................... | G06F 3/0443 |
| 11,086,449 B2* | 8/2021 | Jang | ...................... | G06F 3/04184 |
| 11,231,798 B2* | 1/2022 | Kang | ...................... | G06F 3/0443 |
| 11,281,333 B2* | 3/2022 | Kim | ...................... | G06F 3/04186 |
| 11,307,698 B2* | 4/2022 | Jo | ...................... | G06F 3/0412 |
| 11,347,360 B2* | 5/2022 | Zhao | ...................... | G06F 3/0443 |
| 11,379,076 B2* | 7/2022 | Kim | ...................... | G06F 3/04162 |
| 11,435,846 B2* | 9/2022 | Kim | ...................... | G06F 3/04166 |
| 11,526,247 B2* | 12/2022 | Kim | ...................... | G06F 3/04186 |

(Continued)

Primary Examiner — Patrick F Marinelli
(74) Attorney, Agent, or Firm — Fish & Richardson P.C.

(57) ABSTRACT

A touch display device including a touch power signal generation circuit includes a display panel having a driving voltage line and a base voltage line for driving a light emitting element, a plurality of touch electrodes, and a subpixel, a touch circuit applying a touch driving signal to the plurality of touch electrodes and detecting touch sensing according to a change in capacitance, a touch power signal generation circuit applying a touch power signal having the same phase and amplitude as the touch driving signal to the driving voltage line and the base voltage line during a touch driving period, and a timing controller controlling the touch circuit and the touch power signal generation circuit.

19 Claims, 14 Drawing Sheets

(56) References Cited

U.S. PATENT DOCUMENTS

| | | | |
|---|---|---|---|
| 11,635,832 B2* | 4/2023 | Lin | G06F 3/04184 |
| | | | 345/174 |
| 11,650,689 B2* | 5/2023 | Kim | G09G 3/32 |
| | | | 345/174 |
| 11,669,182 B2* | 6/2023 | Lin | G06F 3/0412 |
| | | | 345/174 |
| 11,914,810 B2* | 2/2024 | Kim | G06F 3/04162 |
| 2017/0090629 A1* | 3/2017 | Kim | G09G 3/2092 |
| 2017/0090630 A1* | 3/2017 | Kim | G06F 3/0443 |
| 2017/0090643 A1* | 3/2017 | Kim | G06F 3/044 |
| 2017/0090673 A1* | 3/2017 | Kim | G06F 3/0418 |
| 2017/0102825 A1* | 4/2017 | Kim | G06F 3/04166 |
| 2017/0329167 A1* | 11/2017 | Kim | G06F 3/0418 |
| 2018/0239488 A1* | 8/2018 | Lin | G06F 3/0443 |
| 2019/0121468 A1* | 4/2019 | Jun | G06F 3/045 |
| 2019/0265835 A1* | 8/2019 | Shin | G09G 3/3233 |
| 2019/0384475 A1* | 12/2019 | Kim | G09G 3/3225 |
| 2020/0210018 A1* | 7/2020 | Kim | G09G 3/3674 |
| 2020/0401258 A1* | 12/2020 | Kang | G06F 3/04164 |
| 2021/0004103 A1* | 1/2021 | Jang | G06F 3/04184 |
| 2021/0191555 A1* | 6/2021 | Jo | G09G 3/3674 |
| 2021/0191561 A1* | 6/2021 | Kim | G06F 3/04164 |
| 2021/0200417 A1* | 7/2021 | Kim | G06F 3/0443 |
| 2021/0223938 A1* | 7/2021 | Kim | G06F 3/04162 |
| 2021/0232256 A1* | 7/2021 | Kim | G06F 3/0412 |
| 2021/0342035 A1* | 11/2021 | Zhao | G09G 3/3241 |
| 2022/0027012 A1* | 1/2022 | Kim | G06F 3/0448 |
| 2022/0137769 A1* | 5/2022 | Kim | G06F 3/0442 |
| | | | 345/173 |
| 2022/0171487 A1* | 6/2022 | Lin | G06F 3/04166 |
| 2022/0197435 A1* | 6/2022 | Kremin | G06F 3/0446 |
| 2024/0211078 A1* | 6/2024 | Kim | G06F 3/04184 |

* cited by examiner

TOUCH DISPLAY DEVICE AND TOUCH POWER SIGNAL GENERATION CIRCUIT

CROSS-REFERENCE TO RELATED APPLICATION

This application claims the priority of Korean Patent Application No. 10-2022-0184482, filed on Dec. 26, 2022, which is hereby incorporated by reference in its entirety.

BACKGROUND

Field of the Disclosure

The present disclosure relates to a touch display device and a touch power signal generation circuit, and more particularly, to a touch display device and a touch power signal generation circuit that can stably supply driving current during a touch driving process.

Description of the Background

With the development of multimedia, the importance of flat panel display devices is increasing. In response, flat panel display devices, such as liquid crystal displays, plasma display panels, and organic light emitting displays, have been commercialized.

Also in wide use are touch display devices having a touch panel stacked on a display device, which may detect the point touched by the user's hand or a stylus pen when an electrical characteristic, such as resistance or capacitance, is changed at the touch point, output information corresponding to the touch point, or perform calculation.

Such a touch display device is a user interface and has increasing application to, e.g., small portable terminals, office devices, mobile devices, and the like.

However, as the touch display device has a separate touch panel stacked, it has many drawbacks, such as an increased thickness, reduced light transmittance, and increased manufacturing costs. To address such issues, advanced in-cell touch (AIT) type display devices are proposed which have built-in touch electrodes inside the pixel areas of the display panel.

Such a touch display device may use a common electrode as a touch electrode. Therefore, a low-level driving voltage may be supplied to the common electrode during the display driving period, and a pulse touch driving signal may be provided to the common electrode operating as the touch electrode during the touch driving period.

In this case, a parasitic capacitance is formed due to coupling between the touch electrode and the subpixel. To reduce such an effect, driving may be performed with one frame period temporally divided (time division) into a display driving period for driving the subpixel and a touch driving period for driving the touch electrode.

In particular, when the parasitic capacitance between the touch electrode and the subpixel increases, touch sensitivity and touch recognition accuracy decrease. Therefore, a load free driving method may be used to reduce the effect.

Load free driving is a method for reducing the effect of parasitic capacitance of the touch electrode on touch sensing results by supplying a pulse modulation signal having the same phase and amplitude as the touch driving signal to the data line and gate line of the display panel during the touch driving period.

When load free driving is used, since the touch driving signal and the pulse modulation signal having the same phase and amplitude are applied to two opposite ends of the parasitic capacitance, the influence of the parasitic capacitance may be eliminated. This is because the voltages of two opposite ends of the parasitic capacitance change simultaneously, and as the voltage difference decreases, the amount of charge charged is reduced by the parasitic capacitance.

However, when a pulse modulation signal is applied to the touch electrode during the load free driving process, the driving current flowing through the light emitting element becomes unstable due to a level difference from the driving voltage applied to the driving voltage line, resulting in poor touch sensitivity and image quality.

SUMMARY

Accordingly, the present disclosure is directed to a touch display device and a touch power signal generation circuit that substantially obviate one or more of problems due to limitations and disadvantages described above.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

More specifically, the present disclosure is to provide a touch display device and a touch power signal generation circuit capable of stably supplying a driving current during a touch driving process.

The present disclosure is also to provide a touch display device and a touch power signal generation circuit capable of stably supplying a driving current and reducing a deviation between the driving voltage line and the base voltage line by simultaneously supplying the modulation signals having the same phase and amplitude to the driving voltage line where the high-level driving voltage is applied and the base voltage line where the low-level base voltage is applied.

Further, the present disclosure is to provide a touch display device and a touch power signal generation circuit capable of reducing power consumption caused due to a level difference between the driving voltage line and the base voltage line by applying the same level of signals to the driving voltage line and the base voltage line during the display driving period.

To achieve these and other advantages and in accordance with the present disclosure, as embodied and broadly described, a touch display device includes a display panel having a driving voltage line and a base voltage line for driving a light emitting element, a plurality of touch electrodes, and a subpixel, a touch circuit applying a touch driving signal to the plurality of touch electrodes and detecting touch sensing according to a change in capacitance, a touch power signal generation circuit applying a touch power signal having the same phase and amplitude as the touch driving signal to the driving voltage line and the base voltage line during a touch driving period, and a timing controller controlling the touch circuit and the touch power signal generation circuit.

In another aspect of the present disclosure, a touch power signal generation circuit includes a driving control circuit for controlling a driving current flowing through a driving voltage line in a display panel having a plurality of touch electrodes, a driving current supply circuit supplying the driving current to a light emitting element disposed on the display panel through the driving voltage line, a base voltage supply circuit supplying a pulse modulation signal to a base voltage line, and a coupling circuit controlling an electrical connection state between the driving voltage line and the base voltage line, wherein a touch power signal having the same phase and amplitude as a touch driving signal applied to the plurality of touch electrodes is applied to the driving voltage line and the base voltage line during a touch driving period.

According to various aspects of the disclosure, there may be provided a touch display device and a touch power signal generation circuit capable of stably supplying a driving current during a touch driving process.

According to various aspects of the disclosure, it is possible to stably supply a driving current and reducing a deviation between the driving voltage and the base voltage by simultaneously supplying the pulse modulation signals having the same phase and amplitude to the driving voltage line where the high-level driving voltage is applied and the base voltage line where the low-level base voltage is applied.

According to various aspects of the disclosures, it is possible to enable low power consumption by reducing power consumption caused due to a level difference between the driving voltage line and the base voltage line by applying the same level of signals to the driving voltage line and the base voltage line during the display driving period.

It is to be understood that both the foregoing general description and the following detailed description are exemplary and explanatory and are intended to provide further explanation of the disclosure as claimed.

BRIEF DESCRIPTION OF THE DRAWINGS

The above and other features and advantages of the disclosure will be more clearly understood from the following detailed description, taken in conjunction with the accompanying drawings, in which.

DETAILED DESCRIPTION

Figure 1:
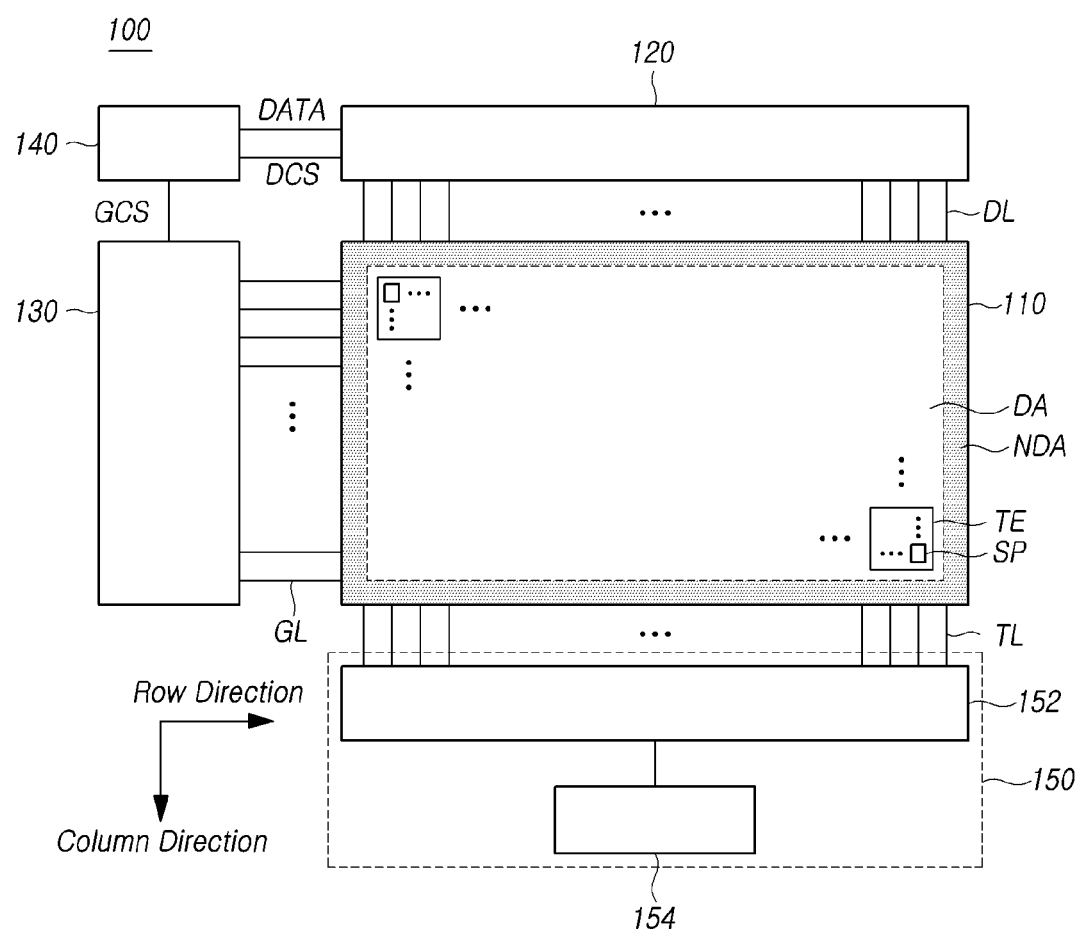
FIG. 1 is a view schematically illustrating a touch display device according to aspects of the disclosure.

Hereinafter, some aspects of the disclosure will be described in detail with reference to exemplary drawings. In the following description of examples or aspects of the disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the disclosure, detailed descriptions of well-known functions and components incorporated herein will be omitted when it is determined that the description may make the subject matter in some aspects of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "may".

Hereinafter, various aspects of the disclosure will be described in detail with reference to the accompanying drawings.

FIG. 1 is a view schematically illustrating a touch display device according to aspects of the disclosure.

Referring to FIG. 1, a touch display device 100 according to aspects of the disclosure may include a display panel 110, a data driving circuit 120, a gate driving circuit 130, and a timing controller 140 as components for displaying images.

The display panel 110 may include a display area DA in which images are displayed and a non-display area NDA in which no image is displayed.

The non-display area NDA may be an outer area of the display area DA. As an example, the non-display area NDA may be referred to as a bezel area. As an example, the non-display area NDA may be adjacent to the display area DA or surround the display area DA. The non-display area NDA may be an area visible from the front of the touch display device 100 or at least a part of which is bent and not visible from the front of the touch display device 100.

The display panel 110 may include a plurality of subpixels SP. For example, the touch display device 100 may be various types of display devices including a liquid crystal display device, an organic light emitting display device, a micro light emitting diode (micro LED) display device, and a quantum dot display device.

The structure of each of the plurality of subpixels SP may vary according to the type of the touch display device 100. For example, when the touch display device 100 is a self-emission display device in which the subpixels SP emit light by themselves, each subpixel SP may include a light emitting element that emits light by itself, one or more transistors, and one or more capacitors.

The display panel 110 may further include various types of signal lines to drive the plurality of subpixels SP. For example, various types of signal lines may include a plurality of data lines DL transferring data signals (also referred to as data voltages or image data) and a plurality of gate lines GL transferring gate signals (also referred to as scan signals).

The plurality of data lines DL and the plurality of gate lines GL may cross each other. Each of the plurality of data lines DL may be disposed while extending in a column direction. Each of the plurality of gate lines GL may be disposed while extending in a row direction, each of the plurality of subpixels SP may be disposed in the region where gate lines and data lines intersect with each other.

Here, the column direction and the row direction are relative. For example, the column direction may be a vertical direction and the row direction may be a horizontal direction. As another example, the column direction may be a horizontal direction and the row direction may be a vertical direction. As an example, at least one of the column direction and the row direction may be a diagonal direction.

The data driving circuit 120 is a circuit for driving the plurality of data lines DL, and may output data signals to the plurality of data lines DL. The gate driving circuit 130 is a circuit for driving the plurality of gate lines GL, and may supply gate signals to the plurality of gate lines GL arranged on the display panel 110, thereby controlling the driving timing of the plurality of subpixels SP. The data driving circuit 120 may output a data voltage to each data line DL according to the timing at which a scan signal is applied through the gate line GL and may control each subpixel to represent a brightness according to the image data.

The timing controller 140 is a device for controlling the data driving circuit 120 and the gate driving circuit 130 and may control driving timings for the plurality of data lines DL and driving timings for the plurality of gate lines GL. In some embodiments, the timing controller 140 may be implemented by various circuits or electronic parts such as an integrated circuit (IC), a field programmable gate array (FPGA), an application specific integrated circuit (ASIC), a processor, and/or the like.

The timing controller 140 may supply various types of data driving control signals DCS to the data driving circuit 120 to control the data driving circuit 120 and may supply various types of gate driving control signals GCS to the gate driving circuit 130 to control the gate driving circuit 130.

The data driving circuit 120 may supply data signals to the plurality of data lines DL according to the driving timing control by the timing controller 140. The data driving circuit 120 may receive digital image data DATA from the timing controller 140 and may convert the received image data DATA into analog data signals and output them to the plurality of data lines DL according to the timing at which the scan signal is applied through the gate line GL, thereby driving the plurality of data lines DL. The data driving circuit 120 is also referred to as a source driving circuit. Such a data driving circuit 120 may include at least one source driver integrated circuit (SDIC). Each source driver integrated circuit (SDIC) may include a shift register, a level shifter, a latch circuit, a digital-to-analog converter (DAC), an output buffer, and so forth. As the case may be, each source driver integrated circuit (SDIC) may further include an analog-to-digital converter (ADC.

The gate driving circuit 130 may supply gate signals to the plurality of gate lines GL according to the timing control of the timing controller 140. The gate driving circuit 130 may receive a first gate voltage corresponding to a turn-on level voltage and a second gate voltage corresponding to a turn-off level voltage, along with various gate driving control signals GCS, generate gate signals, and supply the generated gate signals to the plurality of gate lines GL. The turn-on level voltage may be a high level voltage, and the turn-off level voltage may be a low level voltage. Conversely, the turn-on level voltage may be a low level voltage, and the turn-off level voltage may be a high level voltage. The gate driving circuit 130 may sequentially drive the plurality of gate lines GL, thereby controlling the driving timing of the plurality of subpixels SP.

To provide a touch sensing function as well as an image display function, the touch display device 100 may include a touch panel and a touch circuit 150 that senses the touch panel to detect whether a touch occurs by a touch object, such as a finger or pen, or the position of the touch.

The touch circuit 150 may include a touch driving circuit 152 that drives and senses the touch panel and generates and outputs touch sensing data and a touch controller 154 that may detect an occurrence of a touch or the position of the touch using touch sensing data.

The touch panel may include a plurality of touch electrodes TE as touch sensors. The touch panel may further include a plurality of touch lines TL for electrically connecting the plurality of touch electrodes TE and the touch driving circuit 152. The touch panel or touch electrode TE is also referred to as a touch sensor.

The touch panel may exist outside or inside the display panel 110. When the touch panel exists outside the display panel 110, the touch panel is referred to as an external-type touch panel. When the touch panel is of the external type, the touch panel and the display panel 110 may be separately manufactured or may be combined. The external-type touch panel may include a substrate and a plurality of touch electrodes TE on the substrate.

When the touch panel exists inside the display panel 110, the touch panel is referred to as an internal-type touch panel. In the internal-type touch panel, the touch panel may be formed in the display panel 110 during a manufacturing process of the display panel 110.

The touch driving circuit 152 may supply a touch driving signal to at least one of the plurality of touch electrodes TE, detect a touch sensing signal transferred from at least one touch electrode TE among the plurality of touch electrodes TE, and generate touch sensing data.

The touch circuit 150 may perform touch sensing in a self-capacitance sensing scheme or a mutual-capacitance sensing scheme.

When the touch circuit 150 performs touch sensing in the self-capacitance sensing scheme, the touch circuit 150 may perform touch sensing based on capacitance between each touch electrode TE and the touch object (e.g., finger or pen).

When the touch circuit 150 performs touch sensing in the mutual-capacitance sensing scheme, the touch circuit 150 may perform touch sensing based on capacitance between the touch electrodes TE.

According to the mutual-capacitance sensing scheme, the plurality of touch electrodes TE are divided into driving touch electrodes and sensing touch electrodes. The touch driving circuit 152 may drive the driving touch electrode by the touch driving signal and may detect the touch sensing signal from the sensing touch electrode. For example, when a touch operation is performed on the display device 100, a variation of a capacitance may occur between the driving touch electrodes and sensing touch electrodes, and touch circuit 150 may sense a variation of a capacitance to detect touch coordinates.

According to the self-capacitance sensing scheme, each of the plurality of touch electrodes TE may serve both as a driving touch electrode and as a sensing touch electrode. The touch driving circuit 152 may drive all or some of the plurality of touch electrodes TE and sense all or some of the plurality of touch electrodes TE.

The touch driving circuit 152 and the touch controller 154 may be implemented as separate devices or as a single device.

Or, the touch driving circuit 152 and the data driving circuit 120 may be implemented as separate integrated circuits. Alternatively, the whole or part of the touch driving circuit 152 and the whole or part of the data driving circuit 120 may be integrated into a single integrated circuit.

The touch display device 100 according to aspects of the disclosure may be a self-emissive display device having self-emissive light emitting elements disposed on the display panel 110, such as an organic light emitting display device, a quantum dot display device, a micro LED display device, and the like.

Figure 2:
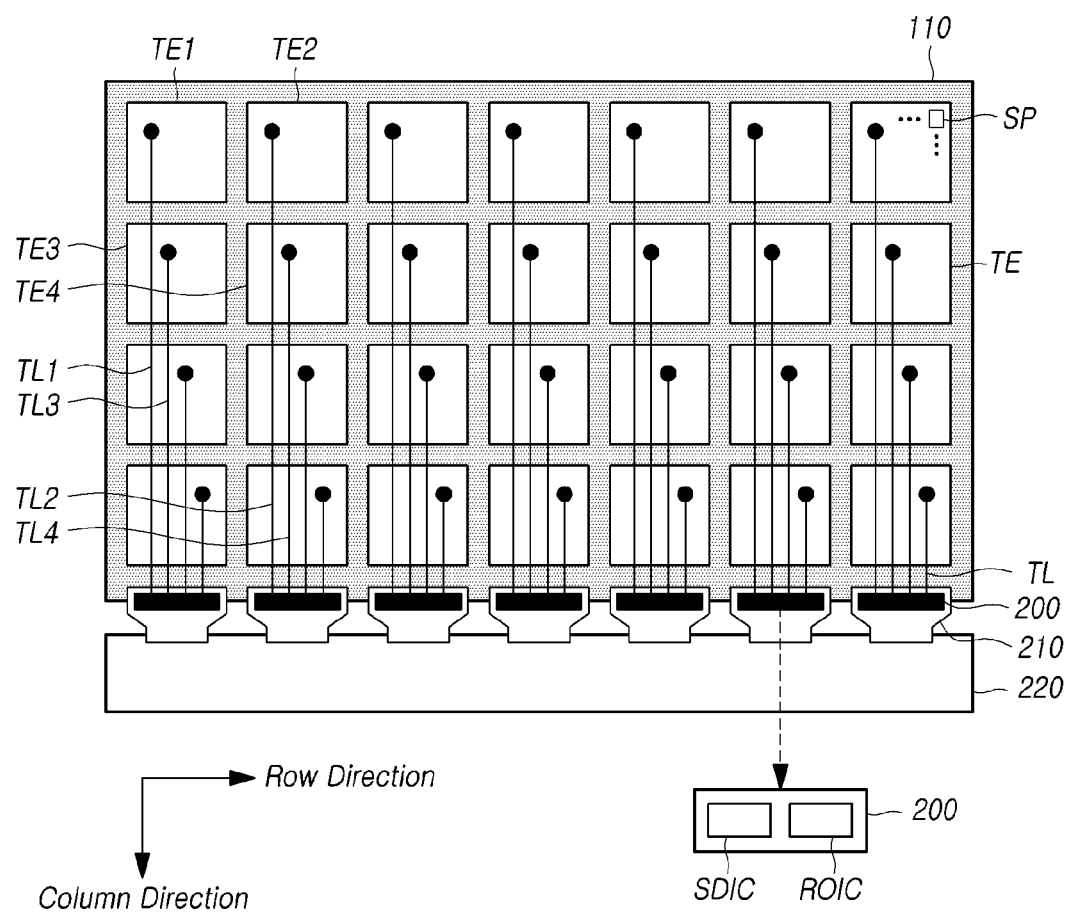
FIG. 2 is a view illustrating an example touch sensing system of a touch display device according to aspects of the disclosure.

FIG. 2 is a view illustrating an example touch sensing system of a touch display device according to aspects of the disclosure.

Referring to FIG. 2, a touch sensing system of a touch display device 100 according to aspects of the disclosure may include a plurality of touch electrodes TE, a plurality of touch lines TL, a touch driving circuit 152, and a touch controller 154.

In the touch display device 100 according to aspects of the disclosure, the data driving circuit 120 may include a plurality of data driving integrated circuits SDICs, and the touch driving circuit 152 may include a plurality of touch driving integrated circuits ROIC.

Each of the plurality of data driven integrated circuits SDIC may be implemented as a separate integrated circuit. Each of the plurality of touch driving integrated circuits ROIC may be implemented as a separate integrated circuit.

Alternatively, at least one data driving integrated circuit SDIC and at least one touch driving integrated circuit ROIC may be integrated into one integrated circuit 200.

According to this, the touch display device 100 according to aspects of the disclosure may include one or more integrated circuits 200, and each integrated circuit 200 may include at least one data driving integrated circuit SDIC and at least one touch driving integrated circuit ROIC.

For example, in the touch display device 100 according to aspects of the disclosure, each of the plurality of integrated circuits 200 may be mounted on the circuit film 210. One side of the plurality of circuit films 210 on which the plurality of integrated circuits 200 are mounted may be electrically connected to the display panel 110.

The other side of the plurality of circuit films 210 on which the plurality of integrated circuits 200 are mounted may be electrically connected to the source printed circuit board 220. As an example, at least one of the data driving integrated circuit SDIC, the touch driving integrated circuit ROIC and the integrated circuit 200 may be connected to the display panel 110 (e.g., a bonding pad of the display panel 110) by a tape automated bonding (TAB) method or a chip-on-glass (COG) method. Alternatively, at least one of the data driving integrated circuit SDIC, the touch driving integrated circuit ROIC and the integrated circuit 200 may be implemented as a gate-in-panel (GIP) type and disposed directly on the display panel 110. Alternatively, at least one of the data driving integrated circuit SDIC, the touch driving integrated circuit ROIC and the integrated circuit 200 may be integrated and disposed on the display panel 110 in some cases.

In the touch display device 100 according to aspects of the disclosure, each of the plurality of touch electrodes TE may be electrically connected to the touch driving integrated circuit ROIC through at least one touch line TL.

The plurality of touch electrodes TE may be positioned on the same layer, and the plurality of touch lines TL may be positioned on a different layer from that of the plurality of touch electrodes TE. As an example, the plurality of touch electrodes TE may be positioned on the two or more layers, and/or at least a part of the plurality of touch lines TL may be positioned on the same layer as at least a part of the plurality of touch electrodes TE.

The plurality of touch electrodes TE include a first touch electrode TE1, a second touch electrode TE2 adjacent to the first touch electrode TE1 in a row direction, a third touch electrode TE3 adjacent to the first touch electrode TE1 in a column direction, and a fourth touch electrode TE4 adjacent to the third touch electrode TE3 in the row direction.

The first touch electrode TE1 may be electrically connected to the first touch line TL1, the second touch electrode TE2 may be electrically connected to the second touch line TL2, the third touch electrode TE3 may be electrically connected to the third touch line TL3, and the fourth touch electrode TE4 may be electrically connected to the fourth touch line TL4.

The first touch line TL1 overlaps the third touch electrode TE3 but is not electrically connected to the third touch electrode TE3. The second touch line TL2 overlaps the fourth touch electrode TE4 but is not electrically connected to the fourth touch electrode TE4.

Each of the plurality of touch electrodes TE may overlap one or more subpixels SP.

For example, one touch electrode TE may overlap two or more subpixels SP. In other words, the area size of one touch electrode TE may correspond to the area size of two or more subpixels SP. In this case, each of the plurality of touch electrodes TE may overlap two or more data lines DL and may overlap two or more gate lines GL.

Since the first touch electrode TE1 and the second touch electrode TE2 are disposed in the same touch electrode row, they may overlap the same two or more gate lines GL. Since the third touch electrode TE3 and the fourth touch electrode TE4 are disposed in the same touch electrode row, they may overlap the same two or more gate lines GL. As an example, the touch electrode row may be not in parallel with the gate lines GL. As an example, the first touch electrode TE1 and the second touch electrode TE2 disposed in the same touch electrode row may overlap different gate lines GL.

Since the first touch electrode TE1 and the third touch electrode TE3 are disposed in the same touch electrode column, they may overlap the same two or more data lines DL. Since the second touch electrode TE2 and the fourth touch electrode TE4 are disposed in the same touch electrode column, they may overlap the same two or more data lines DL. As an example, the touch electrode column may be not in parallel with the data lines DL. As an example, the first touch electrode TE1 and the third touch electrode TE3 disposed in the same touch electrode column may overlap different data lines DL.

Each of the plurality of touch electrodes TE may be a mesh-type electrode having a plurality of openings. Each of the plurality of openings in each touch electrode TE may correspond to the emission area or transmission area (or transparent area) of the subpixel SP.

Figure 3:
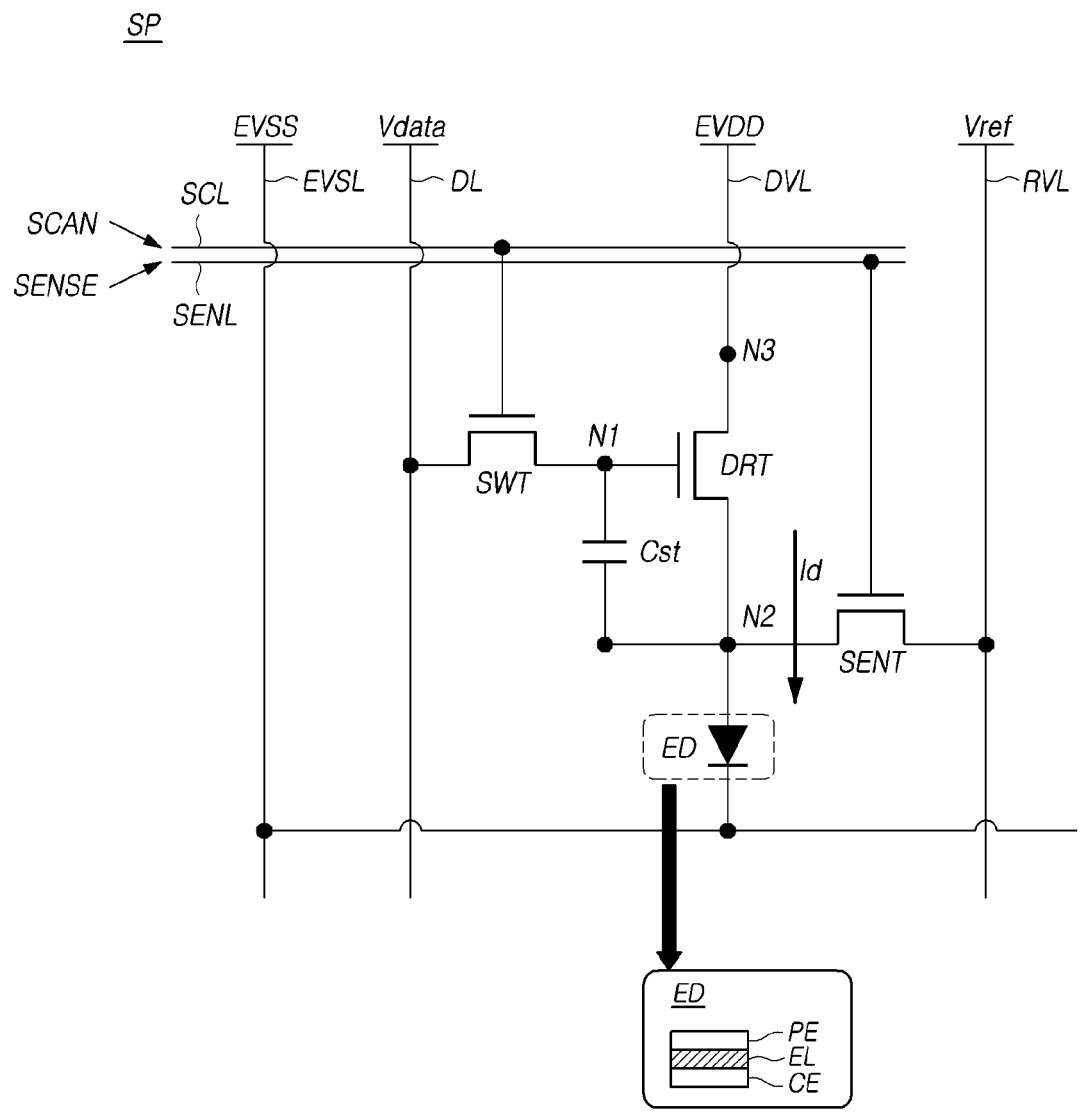
FIG. 3 is a view illustrating an example equivalent circuit of a subpixel constituting a display panel in a touch display device according to aspects of the disclosure.

FIG. 3 is a view illustrating an example equivalent circuit of a subpixel constituting a display panel in a touch display device according to aspects of the disclosure.

Referring to FIG. 3, in the touch display apparatus 100 according to aspects of the disclosure, each of the plurality of subpixels SP may include a light emitting element ED, a driving transistor DRT for driving the light emitting element ED, a switching transistor SWT for switching an electrical connection between the gate electrode of the driving transistor DRT and a data line DL, and a storage capacitor Cst electrically connected between the gate electrode of the driving transistor DRT and the source electrode or drain electrode of the driving transistor DRT.

The gate electrode of the driving transistor DRT corresponds to the first node N1. The source electrode or drain electrode of the driving transistor DRT corresponds to the second node N2. The drain electrode or source electrode of the driving transistor DRT corresponds to the third node N3.

The light emitting element ED may include a pixel electrode PE, a light emitting layer EL, and a common electrode CE. The light emitting layer EL may be positioned on the common electrode CE, and the pixel electrode PE may be positioned on the light emitting layer EL. For example, the light emitting element ED is a device for a self-luminous display, and may include an organic light emitting diode (OLED), a light emitting element formed of a quantum dot, or a micro light emitting diode (micro LED).

The drain electrode or source electrode of the switching transistor SWT may be electrically connected to the data line DL. The source electrode or drain electrode of the switching transistor SWT may be electrically connected to the gate electrode of the driving transistor DRT at the first node N1. The gate electrode of the switching transistor SWT may be electrically connected to the scan signal line SCL, which is a type of gate line GL. The on/off of the switching transistor SWT may be controlled by the scan signal SCAN supplied from the scan signal line SCL.

The storage capacitor Cst may be electrically connected between the first node N1 and the second node N2. The storage capacitor Cst may serve to maintain a voltage difference between the first node N1 and the second node N2 for a predetermined period of time (e.g., one frame time). The storage capacitor Cst is not an internal capacitor (parasitic capacitor) of the driving transistor DRT, but an external capacitor intentionally designed outside the driving transistor DRT to drive the subpixel SP.

It has been described above that each subpixel SP includes a light emitting element ED, two transistors DRT and SWT, and one capacitor Cst, but each subpixel SP may further include one or more transistors and, in some cases, may further include one or more capacitors.

For example, as illustrated in FIG. 3, each subpixel SP may further include a sensing transistor SENT for controlling the connection between the second node N2 and the reference voltage line RVL.

The drain electrode or source electrode of the sensing transistor SENT may be electrically connected to the reference voltage line RVL. The source electrode or drain electrode of the sensing transistor SENT may be electrically connected to the source electrode or drain electrode of the driving transistor DRT at the second node N2 and may also be electrically connected to the pixel electrode PE. The gate electrode of the sensing transistor SENT may be electrically connected to the sense signal line SENL, which is a type of gate line GL. The on/off of the sensing transistor SENT may be controlled by the sense signal SENSE supplied from the sense signal line SENL.

The pixel electrode PE may be disposed in each of a plurality of subpixels SP, and may be electrically connected to the source electrode or drain electrode of the driving transistor DRT. In other words, at the second node N2, the pixel electrode PE may be electrically connected to the source electrode or drain electrode of the driving transistor DRT.

The third node N3 of the driving transistor DRT may be electrically connected to the driving voltage line DVL to which a high-level driving voltage EVDD is applied and be the drain electrode or source electrode of the driving transistor DRT.

In this case, during a display driving period, a high-level driving voltage EVDD necessary for displaying an image may be supplied to the driving voltage line DVL. For example, the high-level driving voltage EVDD necessary for displaying an image may be 27 V.

The driving transistor DRT is turned on by a voltage difference between the first node N1 and the third node N3, supplying a driving current Id to the light emitting element ED.

The common electrode CE may be commonly disposed in a plurality of subpixels SP. A low-level base voltage EVSS having no voltage level change may be applied to the common electrode CE. Here, the low-level base voltage EVSS may correspond to a common voltage commonly applied to light emitting elements ED of all the subpixels SP.

In the touch display device 100 according to aspects of the disclosure, the display panel 110 may further include a plurality of base voltage lines EVSL electrically connected to the common electrode CE.

When the plurality of base voltage lines EVSL are used, the low-level base voltage EVSS may be uniformly applied to the entire area of the common electrode CE. The method of supplying the low-level base voltage EVSS using the plurality of base voltage lines EVSL may have an effect of efficiently supplying the low-level base voltage EVSS when a large-area common electrode CE is provided due to the large-area display panel 110.

Here, the high-level driving voltage EVDD and the low-level base voltage EVSS may be referred to as touch power signals for the operation of the display panel 110, and the driving voltage line DVL and the base voltage line EVSL may be referred to as touch power signal lines.

Figure 4:
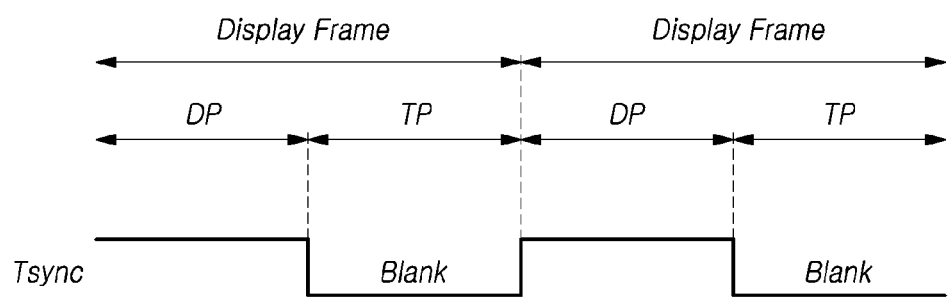
FIG. 4 is a timing diagram illustrating a display driving period and a touch driving period in a touch display device according to aspects of the disclosure.

FIG. 4 is a timing diagram illustrating a display driving period and a touch driving period in a touch display device according to aspects of the disclosure.

Referring to FIG. 4, the touch display device 100 according to aspects of the disclosure may perform display driving for image display during a predetermined display driving period DP within one display frame period Display Frame and may perform touch driving for sensing a touch input by a finger or a stylus during a predetermined touch driving period TP within one display frame period Display Frame.

The touch display device 100 may include a separate touch electrode TE for touch sensing or may use the common electrode CE for driving the subpixel SP as the touch electrode TE.

When a separate touch electrode TE is provided, a touch driving signal for driving the touch electrode TE may be applied during the touch driving period TP. On the other hand, when the common electrode CE is used as the touch electrode TE, the base voltage EVSS is supplied as a common voltage to the thin film transistor connected to the common electrode CE during the display driving period DP, and the touch driving signal may be supplied to the common electrode CE, which operates as the touch electrode TE, during the touch driving period TP.

The display driving period DP and the touch driving period TP may be temporally identical or overlap each other or be temporally separated periods.

When the display driving period DP and the touch driving period TP are temporally separated may be referred to as time division driving.

When the display driving period DP and the touch driving period TP are temporally identical, display driving and touch driving may be performed simultaneously, and such driving scheme may be referred to as time free driving.

In the case of time division driving, the display driving period DP and the touch driving period TP may alternate.

As such, when the display driving period DP and the touch driving period TP are temporally separated while alternating, the touch driving period TP may correspond to a blank period when display driving is not performed.

The touch display device 100 may generate a touch synchronization signal Tsync swinging to a high level and a low level, thereby identifying or controlling the display driving period DP and the touch driving period TP. In other words, the touch synchronization signal Tsync may be a timing control signal defining the touch driving period TP.

For example, the high-level section of the touch synchronization signal Tsync may correspond to the display driving period DP. The low-level section of the touch synchronization signal Tsync may correspond to the touch driving period TP. As an example, the high-level section of the touch synchronization signal Tsync may correspond to the touch driving period TP, while the low-level section of the touch synchronization signal Tsync may correspond to the display driving period DP.

In this case, the touch driving circuit 150 may apply the touch driving signal to the touch electrode TE during the touch driving period TP in which the touch synchronization signal Tsync is at the low level and may sense the presence or absence of a touch and the touch position of the passive stylus or the active stylus using the touch sensing signal received from the touch electrode TE.

Meanwhile, in relation to the scheme for allocating the display driving period DP and the touch driving period TP in one display frame period Display Frame, one display frame period Display Frame may be divided into one display driving period DP and one touch driving period TP. In this case, display driving may be performed during one display driving period DP, and touch driving for sensing a touch input by the passive stylus and the active stylus may be performed during one touch driving period TP corresponding to the vertical blank period Blank.

In other words, the touch display device 100 may perform touch driving once during the display frame period Display Frame which is one period of the frame frequency or the screen change period Refresh Rate of the display panel 110.

For example, when the frame frequency is 60 Hz, display driving of turning on or off the pixels through N gate lines GL constituting the display panel 110 within a period of $\frac{1}{60}$ seconds (16.7 ms) is performed, and then, the touch driving period TP for touch sensing proceeds for a predetermined interval. In this case, the touch detection frequency (touch report rate) will be 60 Hz. As an example, the frame frequency may be 240 Hz, 120 Hz, 50 Hz, 10 Hz, 1 Hz, etc.

As such, touch driving where display driving is performed during one display driving period DP in one display frame period Display Frame, and touch driving is performed during one touch driving period TP which corresponds to the vertical blank period Blank may be referred to as "VB driving." In the VB driving mode, the display driving period DP may correspond to 80% of $\frac{1}{60}$ second (16.7 ms), and the touch driving period TP may correspond to 20% of $\frac{1}{60}$ second (16.7 ms).

As another example, one display frame period Display Frame may be divided into two or more display driving periods DP and two or more touch driving periods TP. Display driving may be performed during two or more display driving periods DP within one display frame period Display Frame, and touch driving for sensing one or two or more touch inputs by the passive stylus and the active stylus in the whole or part of the screen may be performed during two or more touch driving periods TP.

As such, when one display frame period Display Frame is divided into two or more display driving periods DP and two or more touch driving periods TP, and display driving and touch driving are performed, each of two or more blank periods Blank corresponding to two or more touch driving periods TP within one display frame period Display Frame may be referred to as a long horizontal blank LHB.

Accordingly, two or more periods when touch sensing of a stylus or a finger is performed within the display frame period Display Frame may be referred to as an LHB or touch driving period TP, and touch driving performed during two or more LHBs within one display frame period Display Frame may be referred to as "LHB driving." In the LHB driving mode, the display driving period DP and the touch driving period TP each may correspond to 50% of 1/60 second (16.7 ms). As an example, in the LHB driving mode, the touch driving period TP may correspond longer period of 1/60 second than in the VB driving mode, without being limited thereto.

The touch display device 100 of the disclosure may perform load free driving that reduces the effect of the parasitic capacitance of the touch electrode TE on the touch sensing results by supplying the pulse modulation signal having the same phase and amplitude as the touch driving signal applied to the common electrode CE during the touch driving period TP.

In particular, the touch display device 100 of the disclosure simultaneously supplies the pulse modulation signals having the same phase and amplitude through the driving voltage line DVL where the high-level driving voltage EVDD is applied and the base voltage line EVSL where the low-level base voltage EVSS is applied during the touch driving period TP, thereby decreasing the deviation between the driving voltage EVDD and the base voltage EVSS and stably supplying driving current.

Figure 5:
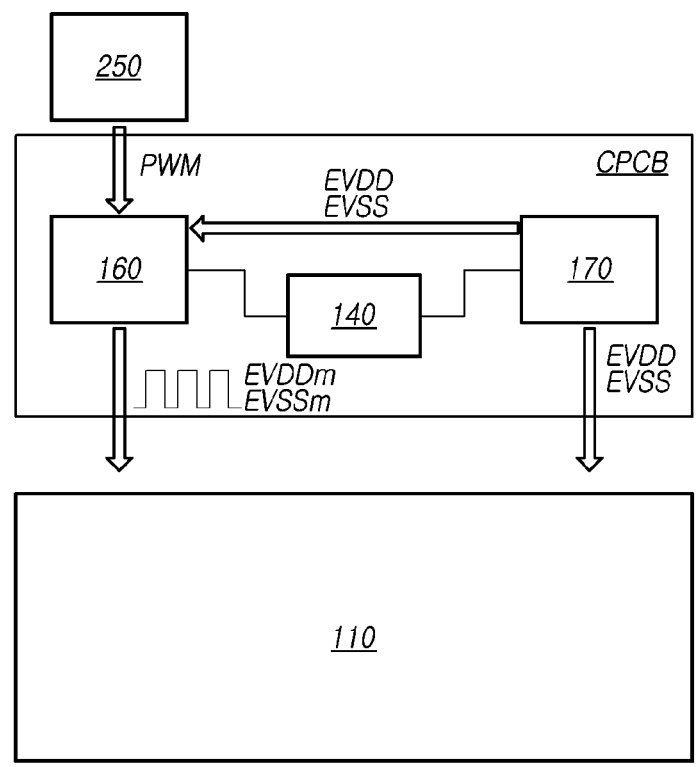
FIG. 5 is a block diagram illustrating a configuration of applying a driving voltage and a base voltage to a display panel in a touch display device according to aspects of the disclosure.

FIG. 5 is a block diagram illustrating a configuration of applying a driving voltage and a base voltage to a display panel in a touch display device according to aspects of the disclosure.

Referring to FIG. 5, a touch display device 100 according to aspects of the disclosure may include a display panel 110, a timing controller 140, a touch power signal integrated circuit 160, a power management integrated circuit 170, and a pulse modulation signal generation circuit 250.

The timing controller 140, the touch power signal integrated circuit 160, and the power management integrated circuit 170 may be mounted on a control printed circuit board CPCB. As an example, at least one of the touch power signal integrated circuit 160, and the power management integrated circuit 170 may be mounted in an area other than the control printed circuit board CPCB. The pulse modulation signal generation circuit 250 may be mounted on the control printed circuit board CPCB or may be separately formed in an area other than the control printed circuit board CPCB.

The control printed circuit board CPCB may be electrically connected to the source printed circuit board on which the data driving circuit 130 is mounted through a cable. The source printed circuit board and the display panel 110 may be electrically connected by, e.g., a chip on film (COF) method, a tape automated bonding (TAB) method or a chip-on-glass (COG) method, etc. When the display panel 110 is small, the control printed circuit board CPCB may be combined with the source printed circuit board.

The timing controller 140 controls the power management integrated circuit 170 such that the high-level driving voltage EVDD and the low-level base voltage EVSS are applied to the display panel 110 during the display driving period DP.

The touch power signal integrated circuit 160 receives the pulse modulation signal PWM from the pulse modulation signal generation circuit 250, and receives the high-level driving voltage EVDD and the low-level base voltage EVSS from the power management integrated circuit 170. The touch power signal integrated circuit 160 converts the high-level driving voltage EVDD into the pulse-modulated driving voltage EVDDm and converts the low-level base voltage EVSS into the pulse-modulated base voltage EVSSm by using the pulse-modulated signal PWM.

The timing controller 140 controls the touch power signal integrated circuit 160 such that the pulse-modulatedpulse-modulated driving voltage EVDDm and the pulse-modulatedpulse-modulated base voltage EVSSm are applied to the display panel 110 during the touch driving period TP.

Figure 6:
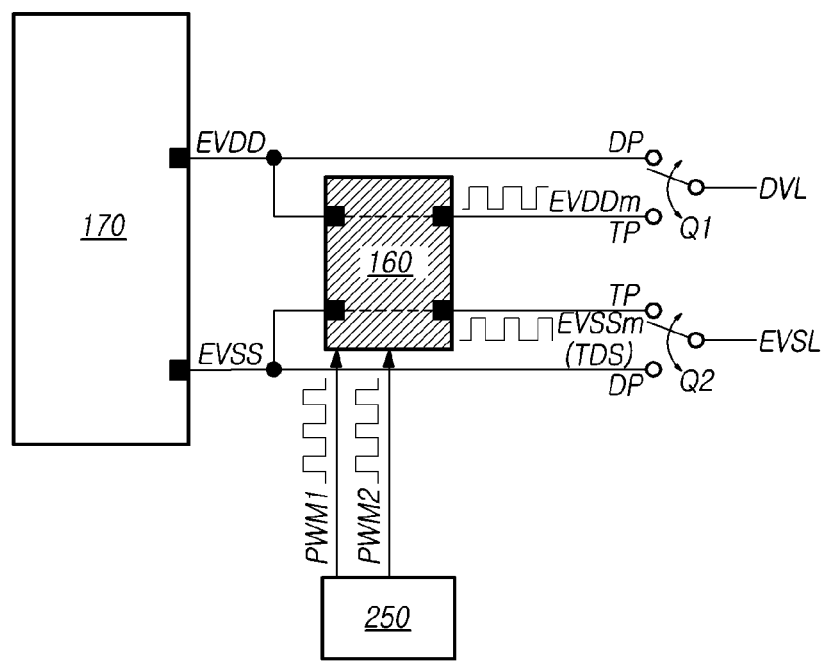
FIG. 6 is a block diagram illustrating a process of generating a modulation driving voltage and a modulation base voltage for load free driving in a touch display device according to aspects of the disclosure.

FIG. 6 is a block diagram illustrating a process of generating a modulation driving voltage and a modulation base voltage for load free driving in a touch display device according to aspects of the disclosure.

Referring to FIG. 6, when the touch display device 100 according to aspects of the disclosure uses the common electrode CE as a touch electrode TE, the touch circuit 150 may use a pulse-modulated base voltage EVSSm transmitted from the touch power signal integrated circuit 160 during a touch driving period TP as a touch driving signal TDS. On the other hand, when the touch electrode TE and the common electrode CE are separated from each other, the pulse-modulatedpulse-modulated base voltage EVSSm may be generated by applying the touch driving signal TDS applied to the touch electrode TE to the base voltage line EVSL during the touch driving period TP.

The pulse-modulated base voltage EVSSm may be supplied to the common electrode CE through the base voltage line EVSL. Further, the touch circuit 150 accumulates the capacitance received from the touch electrode TE to output a touch sensing voltage.

In this case, the pulse-modulatedpulse-modulated driving voltage EVDDm having the same phase and amplitude as the pulse-modulatedpulse-modulated base voltage EVSSm may be applied to the driving voltage line EBL during the touch driving period TP.

As described above, when the pulse-modulated driving voltage EVDDm and the pulse-modulated base voltage EVSSm having the same phase and amplitude are simultaneously supplied through the driving voltage line DVL and the base voltage line EVSL during the touch driving period TP, the deviation between the driving voltage line DVL and the base voltage line EVSL may be reduced and a stable driving current Id may be supplied.

On the other hand, during the display driving period DP, the connection with the touch line TL is released, and the low-level base voltage EVSS is applied to the common electrode CE corresponding to the touch electrode TE.

In other words, the touch circuit 150 may control the switches Q1 and Q2 such that the pulse-modulated base voltage EVSSm corresponding to the touch driving signal TDS is supplied to the base voltage line EVSL during the touch driving period TP, and the pulse-modulated driving voltage EVDDm having the same phase and amplitude as the pulse-modulated base voltage EVSSm (TDS) is supplied to the driving voltage line DVL.

The pulse modulation signal generation circuit 250 may output a first pulse modulation signal PWM1 and a second pulse modulation signal PWM2 having the same phase.

The touch power signal integrated circuit 160 may generate the pulse-modulated base voltage EVSSm having an amplitude between the base voltage of the first level and the base voltage of the second level based on the first pulse modulation signal PWM1, and may generate the pulse-modulated driving voltage EVDDm having the same amplitude as the pulse-modulated base voltage EVSSm based on the second pulse modulation signal PWM2.

The touch power signal integrated circuit 160 level-shifts the first pulse modulation signal PWM1 input from the pulse modulation signal generation circuit 250 with respect to the base voltage EVSS to generate the pulse-modulated base voltage EVSSm corresponding to the touch driving signal TDS. Further, the touch power signal integrated circuit 160 level-shifts the second pulse modulation signal PWM2 input from the pulse modulation signal generation circuit 250 with respect to the driving voltage EVDD to generate the modulation driving signal EVDDm.

Here, only the case in which the touch power signal integrated circuit 160 converts the base voltage EVSS and the driving voltage EVDD into the pulse-modulated base voltage EVSSm and pulse-modulated driving voltage EVDDm is illustrated, but for load free driving, a pulse modulation signal having the same phase and amplitude as the pulse-modulated base voltage EVSSm corresponding to the touch driving signal TDS may be generated and supplied to the data line DL and the gate line GL.

Further, the configuration of the circuit for generating the pulse-modulated base voltage EVSSm and pulse-modulated driving voltage EVDDm may be formed in the touch power signal integrated circuit 160 or be formed in the power management integrated circuit 170, or may be implemented as a separate touch power signal generation circuit in the control printed circuit board CPCB.

Figure 7:
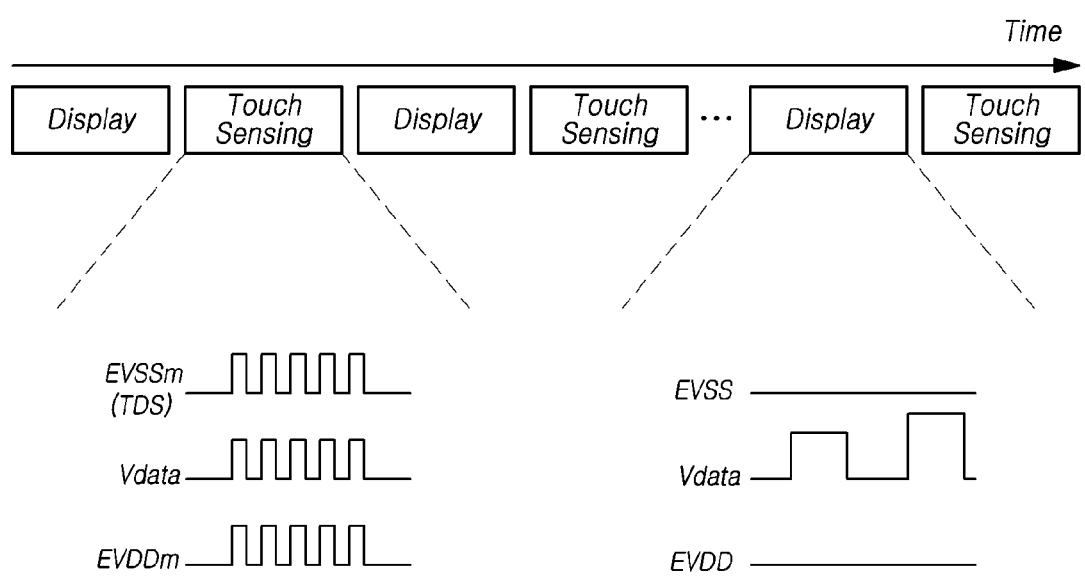
FIG. 7 is a signal timing diagram illustrating an example in which a display driving period and a touch driving period time-divisionally proceed in a touch display device according to aspects of the disclosure.

FIG. 7 is a signal timing diagram illustrating an example in which a display driving period and a touch driving period time-divisionally proceed in a touch display device according to aspects of the disclosure.

Referring to FIG. 7, the touch display device 100 according to aspects of the disclosure may drive the touch electrode TE included in the display panel 110 and perform touch sensing by using a blank period between display driving periods DP, as the touch driving period TP.

For example, the touch display device 100 may perform touch sensing in a vertical blank period present in each display frame period, or may perform touch sensing in a horizontal blank period of some of a plurality of horizontal blank periods present in one display frame period.

When the common electrode CE formed on the display panel 110 is used as the touch electrode TE, the low-level base voltage EVSS may be applied through the touch line TL connected to each touch electrode TE during the display driving period DP, and the pulse-modulated base voltage EVSSm may be applied as the touch driving signal TDS through the touch line TL connected to each touch electrode TE during the touch driving period TP. The touch driving signal TDS may be a pulse signal in which the magnitude of the voltage changes over time.

In this case, when the driving voltage EVDD of a predetermined level is applied to the driving voltage line DVL during the touch driving period TP, a parasitic capacitance may be formed between the driving voltage line DVL and the base voltage line EVSL, thereby deteriorating detection performance of the touch sensing signal.

Accordingly, the touch display device 100 according to the disclosure simultaneously supplies the pulse modulation signals EVDDm and EVSSm having the same phase and amplitude through the driving voltage line DVL and the base voltage line EVSL during the touch driving period TP, thereby reducing the deviation of voltage difference between the driving voltage line DVL and the base voltage line EVSL and supplying a stable driving current Id.

Further, to prevent parasitic capacitance formed between the touch electrode TE and the data line DL during the touch driving period TP, the data voltage Vdata corresponding to the touch driving signal TDS applied to the touch electrode TE may be supplied to the data line DL. For example, during the touch driving period TP when touch sensing is performed, a data voltage Vdata having the same amplitude and phase as the touch driving signal TDS may be supplied to the data line DL.

Meanwhile, during the display driving period DP when the display driving is performed, a data voltage Vdata of a corresponding level may be applied to each subpixel SP.

Figure 8:
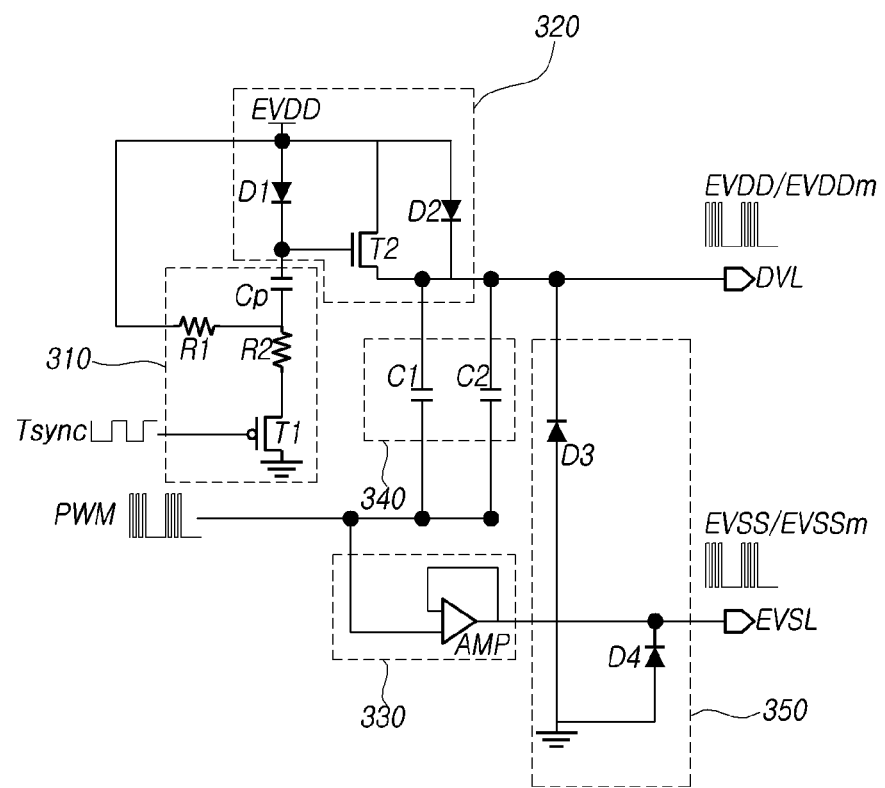
FIG. 8 is a view illustrating an example touch power signal generation circuit for generating a pulse-modulated base voltage and modulation driving voltage in a touch display device according to aspects of the disclosure.

FIG. 8 is a view illustrating an example touch power signal generation circuit for generating a pulse-modulated base voltage and pulse-modulated driving voltage in a touch display device according to aspects of the disclosure.

Referring to FIG. 8, in a touch display device 100 according to aspects of the disclosure, a touch power signal generation circuit for generating a pulse-modulated base voltage EVSSm and a pulse-modulated driving voltage EVDDm may include a driving control circuit 310, a driving current supply circuit 320, a base voltage supply circuit 330, a coupling circuit 340, and an overvoltage prevention circuit 350.

The driving control circuit 310 performs an operation of controlling the driving current Id flowing through the driving voltage line DVL during the display driving period DP and the touch driving period TP.

The driving control circuit 310 may include a first transistor T1 whose source electrode is connected to a ground and which receives a touch synchronization signal Tsync through the gate electrode, a plurality of branch resistors R1 and R2 connected between the drain electrode of the first transistor T1 and a high-level driving voltage EVDD, and a pumping capacitor Cp connected between a branch node between the plurality of branch resistors R1 and R2 and a driving current supply circuit 320.

The first transistor T1 may be turned off during the display driving period DP and may be turned on during the touch driving period TP. When the touch synchronization signal Tsync is at a high level, the display driving period DP proceeds, and when the touch synchronization signal Tsync is at a low level, the touch driving period TP proceeds. As an example, the first transistor T1 may be a P-type transistor.

When the first transistor T1 is turned off by the touch synchronization signal Tsync, the voltage of the node connected to the pumping capacitor Cp increases by the voltage charged to the pumping capacitor Cp.

The driving current supply circuit 320 supplies the driving current Id transferred to the light emitting element ED through the driving voltage line DVL. The driving current supply circuit 320 may include a second transistor T2, a first diode D1, and a second diode D2.

In the first diode D1, the anode electrode is connected to the high-level driving voltage EVDD, and the cathode electrode is connected to the gate electrode of the second transistor T2.

In the second diode D2, the anode electrode is connected to the high-level driving voltage EVDD, and the cathode electrode is connected to the driving voltage line DVL.

In the second transistor T2, the drain electrode is connected to the high-level driving voltage EVDD, the gate electrode is connected to the pumping capacitor Cp of the driving control circuit 310, and the source electrode is connected to the driving voltage line DVL.

The second transistor T2 may be turned on as the voltage of the gate electrode connected to the pumping capacitor Cp of the driving control circuit 310 increases during the display driving period DP, and may be turned off as the voltages of the gate electrode and the source electrode are rendered identical by the first diode D1 and the second diode D2 during the touch driving period D2.

As described above, as the second transistor T2 is turned off during the touch driving period TP, the current may be prevented from flowing back or leaking through the second transistor T2, and thus the driving current Id flowing through the driving voltage line DVL may be more stably supplied.

The base voltage supply circuit 330 supplies the pulse modulation signal PWM to the base voltage line EVSL. The base voltage supply circuit 330 may include an amplifier AMP that receives the pulse modulation signal PWM through the non-inverting input terminal and has the inverting input terminal and the output terminal connected to the base voltage line EVSL.

The pulse modulation signal PWM may be applied at a level of the low-level base voltage EVSS during the display driving period DP, and may be applied in a pulse form having a predetermined amplitude during the touch driving period TP. When the touch electrode TE and the common electrode CE are separately formed, the pulse modulation signal PWM may be regarded as a touch driving signal TDS for driving the touch electrode TE.

The pulse modulation signal PWM may be stably transferred to the base voltage line EVSL by the base voltage supply circuit 330.

The coupling circuit 340 controls an electrical coupling state between the driving voltage line DVL and the base voltage line EVSL. The coupling circuit 340 may include at least one coupling capacitor C1 and C2 connected between the driving voltage line DVL and the base voltage line EVSL.

During the display driving period DP when the DC level driving voltage EVDD and the base voltage EVSS are transferred, the electrical coupling between the driving voltage line DVL and the base voltage line EVSL is cut off by the coupling circuit 340. On the other hand, the driving voltage line DVL and the base voltage line EVSL may be electrically coupled during the touch driving period TP when the pulse-modulated driving voltage EVDDm and pulse-modulated base voltage EVSSm are transferred by the coupling circuit 340, so that the pulse-modulated driving voltage EVDDm and the pulse-modulated base voltage EVSSm may maintain the same phase and amplitude.

The overvoltage prevention circuit 350 may include a third diode D3 having the anode electrode connected to the ground and the cathode electrode connected to the driving voltage line DVL, and a fourth diode D4 having the anode electrode connected to the ground and the cathode electrode connected to the base voltage line EVSL.

The overvoltage prevention circuit 350 is a component for protecting the display panel 110 from unexpected overvoltage or surge caused by static electricity or power deviation, and may be omitted from the touch power signal generation circuit.

Figure 9:
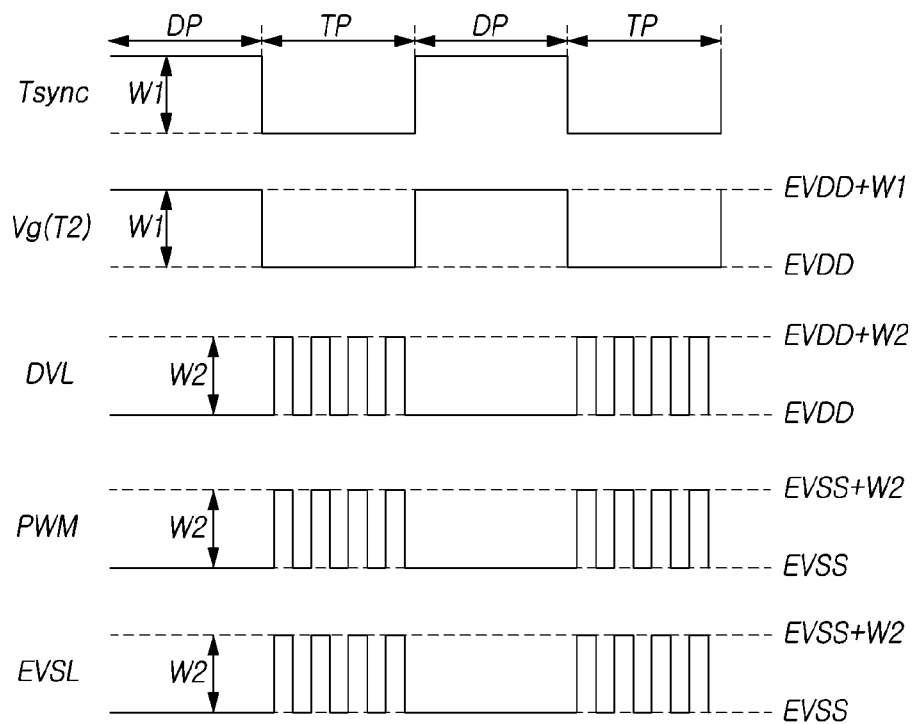
FIG. 9 is a signal waveform diagram according to the operation of a touch power signal generation circuit in a touch display device according to aspects of the disclosure.

FIG. 9 is a signal waveform diagram according to the operation of a touch power signal generation circuit in a touch display device according to aspects of the disclosure.

Referring to FIG. 9, in the touch display device 100 according to aspects of the disclosure, the touch power signal generation circuit may proceed with the display driving period DP when the touch synchronization signal Tsync is at a high level, and may proceed with the touch driving period TP when the touch synchronization signal Tsync is at a low level. In the touch synchronization signal Tsync, the high level and the low level may have a first amplitude W1, and may be determined to be greater than or equal to a threshold voltage capable of turning on the second transistor T2 constituting the driving current supply circuit 320.

The gate electrode of the second transistor T2 may be turned on as the voltage charged to the pumping capacitor Cp of the driving control circuit 310 increases during the display driving period DP, and may be turned off as the voltages of the gate electrode and the source electrode are rendered identical by the first diode D1 and the second diode D2 during the touch driving period TP. Accordingly, the gate voltage Vg(T2) of the second transistor T2 may maintain the level of the driving voltage EVDD during the touch driving period TP, and may maintain the level EVDD+W1 which is higher than the driving voltage EVDD by the first amplitude W1 during the display driving period DP.

The pulse modulation signal PWM may be applied at the level of the low-level base voltage EVSS during the display driving period DP, and may be applied in a pulse form having the second amplitude W2 during the touch driving period TP.

Accordingly, the driving voltage line DVL may maintain the level of the driving voltage EVDD during the display driving period DP, but may be transferred at the level of the pulse-modulated driving voltage EVDDm having the second amplitude W2 by the pulse modulation signal PWM during the touch driving period DP.

Similarly, the base voltage line EVSL maintains the level of the base voltage EVSS during the display driving period DP, but may be transferred at the level of the pulse-modulated base voltage EVSSm having the second amplitude W2 by the pulse modulation signal PWM during the touch driving period DP.

Figure 10:
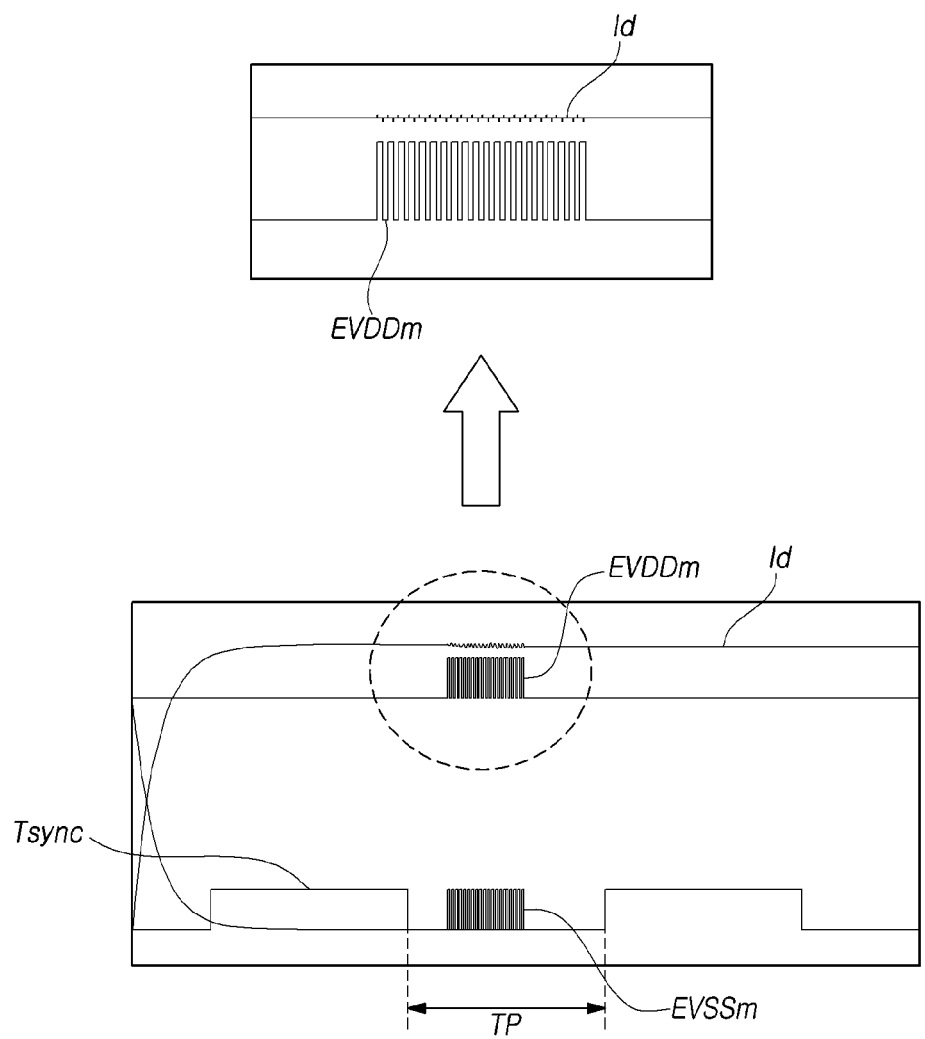
FIG. 10 is a simulation graph produced by measuring a touch power signal and a driving current generated by a touch power signal generation circuit in a touch display device according to aspects of the disclosure.

FIG. 10 is a simulation graph produced by measuring a touch power signal and a driving current generated by a touch power signal generation circuit in a touch display device according to aspects of the disclosure.

Referring to FIG. 10, in the touch display device 100 according to aspects of the disclosure, since the touch power signal generation circuit simultaneously supplies the pulse modulation signals EVDDm and EVSSm having the same phase and amplitude to the driving voltage line DVL and the base voltage line EVSL during the touch driving period TP, it may be identified that the deviation of the voltage difference between the driving voltage line DVL and the base voltage line EVSL is reduced and the driving current Id is stably supplied.

Figure 11:
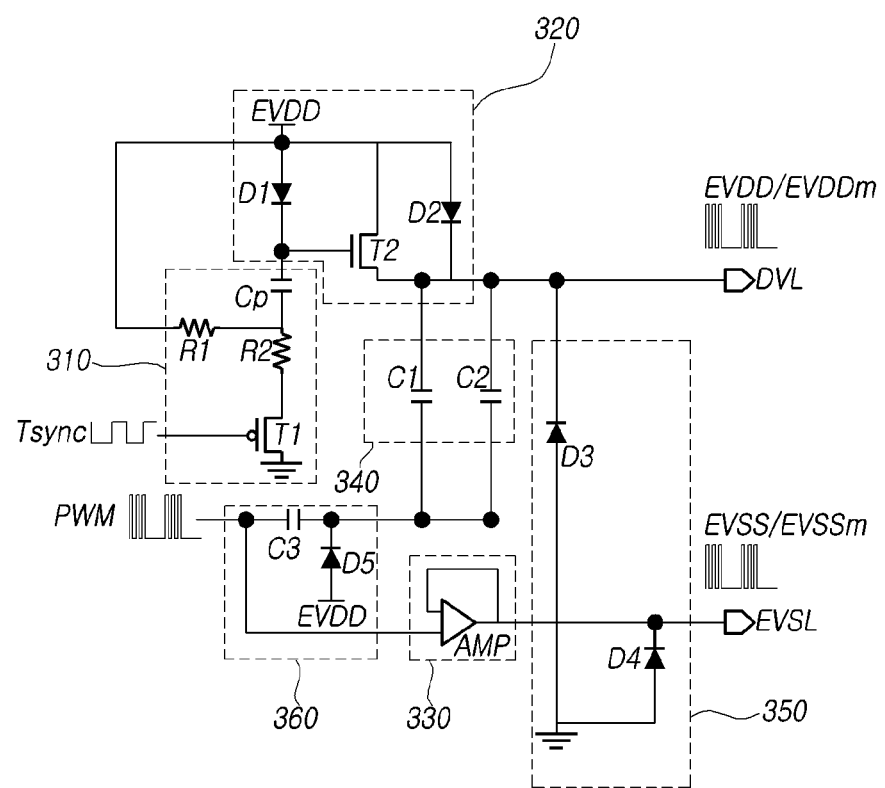
FIG. 11 is a view illustrating another example touch power signal generation circuit for generating a pulse-modulated base voltage and modulation driving voltage in a touch display device according to aspects of the disclosure.
Figure 12:
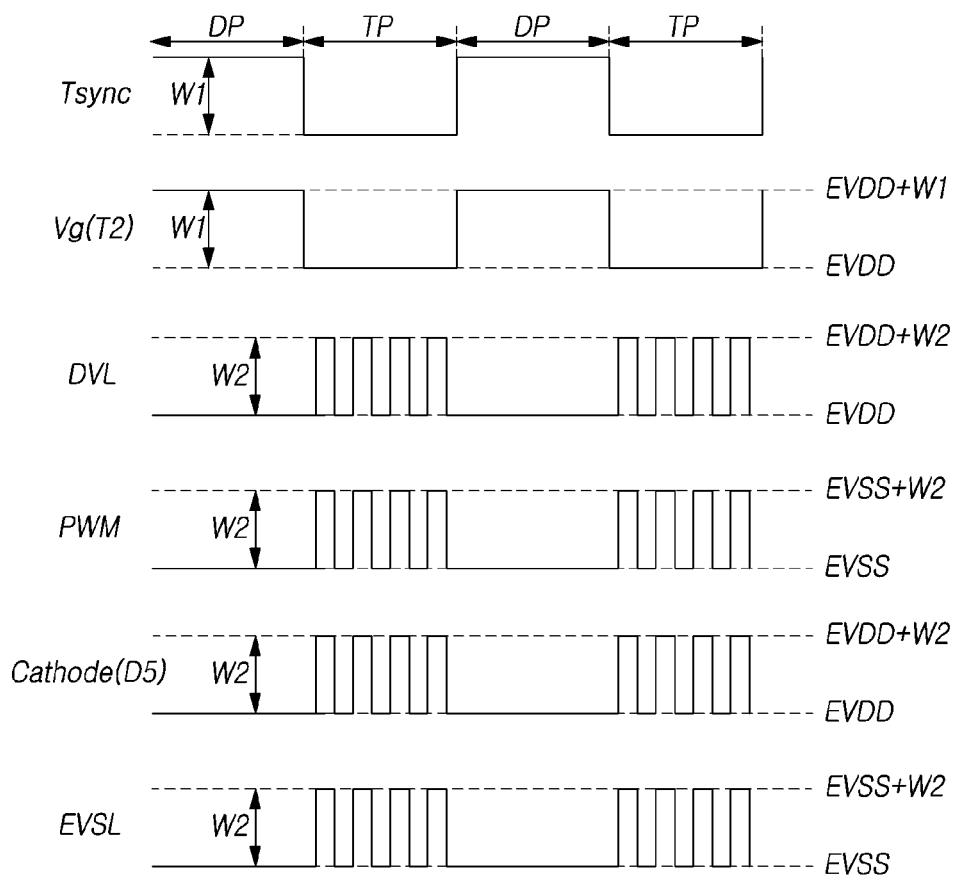
FIG. 12 is a signal waveform diagram according to the operation of another touch power signal generation circuit in a touch display device according to aspects of the disclosure.

FIG. 11 is a view illustrating another example touch power signal generation circuit for generating a pulse-modulated base voltage and pulse-modulated driving voltage in a touch display device according to aspects of the disclosure. FIG. 12 is a signal waveform diagram according to the operation of another touch power signal generation circuit in a touch display device according to aspects of the disclosure.

Referring to FIGS. 11 and 12, in the touch display device 100 according to aspects of the disclosure, a touch power signal generation circuit for generating a pulse-modulated base voltage EVSSm and a pulse-modulated driving voltage EVDDm may include a driving control circuit 310, a driving current supply circuit 320, a base voltage supply circuit 330, a coupling circuit 340, an overvoltage prevention circuit 350, and a clamping circuit 360.

The driving control circuit 310, the driving current supply circuit 320, the base voltage supply circuit 330, the coupling circuit 340, and the overvoltage prevention circuit 350 are the same as those of FIG. 8, and thus a description thereof will be omitted.

The clamping circuit 360 may include a capacitor C3 positioned between the pulse modulation signal PWM and the coupling circuit 340, and a fifth diode D5 having an anode electrode connected to a high-level driving voltage EVDD and a cathode electrode connected to the coupling circuit 340.

Accordingly, during the display driving period DP, a high-level driving voltage EVDD is transferred to the coupling circuit 340, so that the voltages across both ends of the first and second capacitors C1 and C2 are maintained at the same level of the driving voltage EVDD. As a result, current may be prevented from flowing through the coupling circuit 340 during the display driving period DP, so that power consumption may be reduced and a low power operation is possible.

On the other hand, during the touch driving period TP, the pulse modulation signal PWM may be transferred to the driving voltage line DVL and the base voltage line EVSL through the clamping circuit 360 and the coupling circuit 340.

The touch power signal generation circuit may proceed with the display driving period DP when the touch synchronization signal Tsync is at a high level, and may proceed with the touch driving period TP when the touch synchronization signal Tsync is at a low level. The touch synchronization signal Tsync may have a high level and a low level having a first amplitude W1, and may be determined to have a level equal to or higher than a threshold voltage capable of turning on the second transistor T2 constituting the driving current supply circuit 320.

The gate electrode of the second transistor T2 may be turned on as the voltage charged to the pumping capacitor Cp of the driving control circuit 310 increases during the display driving period DP, and may be turned off as the voltages of the gate electrode and the source electrode are rendered identical by the first diode D1 and the second diode D2 during the touch driving period TP. Accordingly, the gate voltage Vg(T2) of the second transistor T2 may maintain the level of the driving voltage EVDD during the touch driving period TP, and may maintain the level EVDD+W1 which is higher than the driving voltage EVDD by the first amplitude W1 during the display driving period DP.

The pulse modulation signal PWM may be applied at the level of the low-level base voltage EVSS during the display driving period DP, and may be applied in a pulse form having the second amplitude W2 during the touch driving period TP.

Accordingly, the driving voltage line DVL may maintain the level of the driving voltage EVDD during the display driving period DP, but may be transferred at the level of the pulse-modulated driving voltage EVDDm having the second amplitude W2 by the pulse modulation signal PWM during the touch driving period DP.

Similarly, the base voltage line EVSL maintains the level of the base voltage EVSS during the display driving period DP, but may be transferred at the level of the pulse-modulated base voltage EVSSm having the second amplitude W2 by the pulse modulation signal PWM during the touch driving period DP.

In this case, since the DC-level voltage applied by the third capacitor C3 of the clamping circuit 360 is cut off during the display driving period DP, the cathode electrode of the fifth diode D5 maintains the high-level driving voltage EVDD. Accordingly, during the display driving period DP, voltages across both ends of the first and second capacitors C1 and C2 are maintained at the same level of the driving voltage EVDD to prevent current from flowing through the coupling circuit 340, thereby reducing power consumption and enabling a low power operation.

On the other hand, during the touch driving period TP, the pulse modulation signal PWM may be transferred to the driving voltage line DVL and the base voltage line EVSL through the clamping circuit 360 and the coupling circuit 340.

Figure 13:
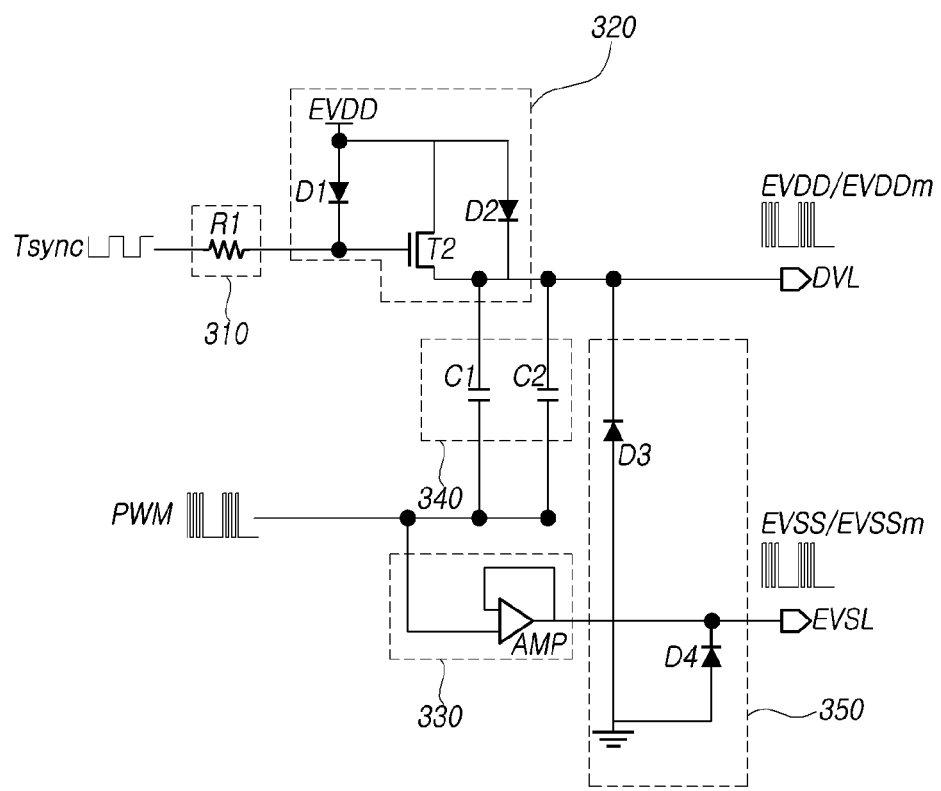
FIG. 13 is a view illustrating another example touch power signal generation circuit for generating a pulse-modulated base voltage and pulse-modulated driving voltage in a touch display device according to aspects of the disclosure.
Figure 14:
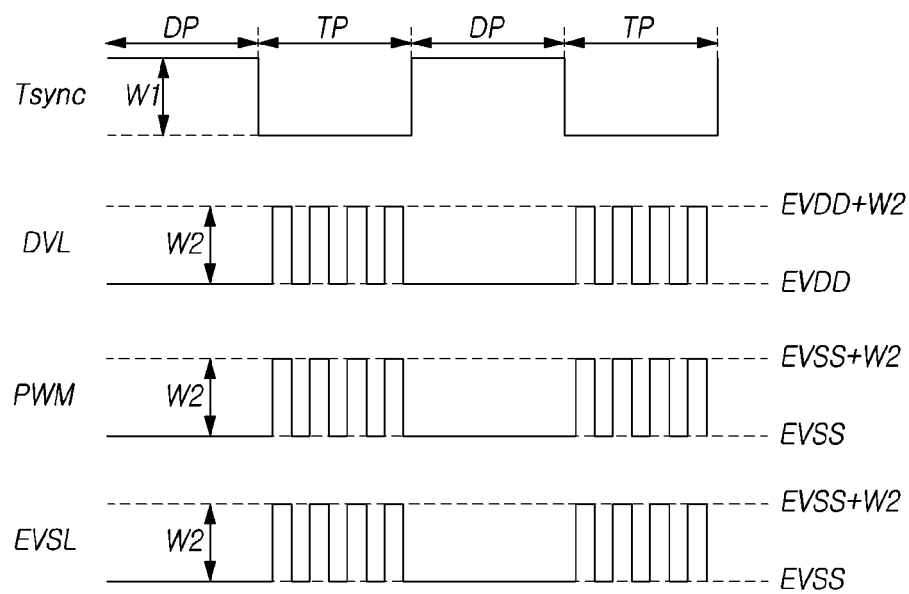
FIG. 14 is a signal waveform diagram according to the operation of another touch power signal generation circuit in a touch display device according to aspects of the disclosure.

FIG. 13 is a view illustrating another example touch power signal generation circuit for generating a pulse-modulated base voltage and pulse-modulated driving voltage in a touch display device according to aspects of the disclosure. FIG. 14 is a signal waveform diagram according to the operation of another touch power signal generation circuit in a touch display device according to aspects of the disclosure.

Referring to FIGS. 13 and 14, in a touch display device 100 according to aspects of the disclosure, a touch power signal generation circuit for generating a pulse-modulated base voltage EVSSm and a pulse-modulated driving voltage EVDDm may include a driving control circuit 310, a driving current supply circuit 320, a base voltage supply circuit 330, a coupling circuit 340, and an overvoltage prevention circuit 350.

FIG. 13 illustrates a case in which the configurations of the driving current supply circuit 320, the base voltage supply circuit 330, the coupling circuit 340, and the overvoltage prevention circuit 350 are the same as those of FIG. 8, and only the configuration of the driving control circuit 310 is changed.

The driving control circuit 310 may include a first resistor R1 that transfers a touch synchronization signal Tsync to the driving current supply circuit 320. Unlike FIG. 8, since the touch synchronization signal Tsync is directly transferred to the driving current supply circuit 320 by the first resistor R1, the driving control circuit 310 controls the operation of the second transistor T2 constituting the driving current supply circuit 320 by the touch synchronization signal Tsync.

In other words, the second transistor T2 may be turned on during the display driving period DP by the touch synchronization signal Tsync, and the second transistor T2 may be turned off during the touch driving period TP.

Meanwhile, the driving current supply circuit 320, the base voltage supply circuit 330, the coupling circuit 340, and the overvoltage prevention circuit 350 are the same as those of FIG. 8, and thus a description thereof will be omitted.

As such, the touch display device 100 of the disclosure simultaneously supplies the pulse modulation signals EVDDm and EVSSm having the same phase and amplitude to the driving voltage line DVL where the high-level driving voltage EVDD is applied and the base voltage line EVSL where the low-level base voltage EVSS is applied in the touch power signal generation circuit, thereby decreasing the deviation of voltage difference between the driving voltage line EVL and the base voltage line EVSL and stably supplying driving current Id.

Aspects of the disclosure described above are briefly described below.

A touch display device 100 according to aspects of the disclosure may comprise a display panel 110 having a driving voltage line DVL and a base voltage line EVSL for driving a light emitting element ED, a plurality of touch electrodes TE, and a subpixel SP, a touch circuit 150 applying a touch driving signal TDS to the plurality of touch electrodes TE and detecting touch sensing according to a change in capacitance, a touch power signal generation circuit applying a touch power signal having the same phase and amplitude as the touch driving signal TDS to the driving voltage line DVL and the base voltage line EVSL during a touch driving period TP, and a timing controller 150 controlling the touch circuit 150 and the touch power signal generation circuit.

The plurality of touch electrodes TE may be electrically connected to the base voltage line EVSL.

The touch driving signal TDS may be a pulse-modulated signal of a base voltage supplied to the base voltage line EVSL.

The touch power signal may include a pulse-modulated driving voltage EVDDm and a pulse-modulated base voltage EVSSm.

The touch power signal generation circuit may be disposed in a touch power integrated circuit 160 generating the touch driving signal TDS or a power management integrated circuit 170 generating the driving voltage EVDD.

The touch power signal generation circuit may be disposed on a control printed circuit board CPCB on which the timing controller 150 is mounted.

The touch power signal generation circuit may include a driving control circuit 310 for controlling a driving current Id flowing through the driving voltage line DVL, a driving current supply circuit 320 supplying the driving current Id to the light emitting element ED through the driving voltage line DVL, a base voltage supply circuit 330 supplying a pulse modulation signal PWM to the base voltage line EVSL, and a coupling circuit 340 controlling an electrical connection state between the driving voltage line DVL and the base voltage line EVSL.

The driving control circuit 310 may include a first transistor T1 having a source electrode connected to a ground and receiving a touch synchronization signal Tsync through a gate electrode, a plurality of branch resistors R1 and R2 connected between a drain electrode of the first transistor T1 and the driving voltage EVDD, and a pumping capacitor Cp connected between a branch node between the plurality of branch resistors R1 and R2 and the driving current supply circuit 320.

The touch synchronization signal Tsync may be varied into a first amplitude W1 capable of turning on a transistor constituting the driving current supply circuit 320.

The pulse modulation signal PWM may be varied into a second amplitude W2 smaller than the first amplitude W1.

The driving control circuit 310 may include a resistor transferring a touch synchronization signal Tsync to the driving current supply circuit 320.

The driving current supply circuit 320 may include a second transistor T2 having a drain electrode supplied with the driving voltage EVDD, a gate electrode connected to the driving control circuit 310, and a source electrode connected to the driving voltage line DVL, a first diode D1 having an anode electrode supplied with the driving voltage EVDD and a cathode electrode connected to the gate electrode of the second transistor T2, and a second diode D2 having an anode electrode supplied with the driving voltage EVDD and a cathode electrode connected to the driving voltage line DVL.

The base voltage supply circuit 330 may include an amplifier AMP receiving the pulse modulation signal PWM through a non-inverting input terminal and having an inverting input terminal and an output terminal connected to the base voltage line EVSL.

The coupling circuit 340 may include at least one coupling capacitor C1 and C2 connected between the driving voltage line DVL and the base voltage line EVSL.

The touch power signal generation circuit may further include an overvoltage prevention circuit 350 connected between the driving voltage line DVL and the base voltage line EVSL.

The overvoltage prevention circuit 350 may include a third diode D3 having the anode electrode connected to the ground and the cathode electrode connected to the driving voltage line DVL, and a fourth diode D4 having the anode electrode connected to the ground and the cathode electrode connected to the base voltage line EVSL.

The touch power signal generation circuit may further include a clamping circuit 360 for maintaining a voltage across both ends of the coupling circuit 340 at the same level during the display driving period DP.

The clamping circuit 360 may include a capacitor C3 positioned between the pulse modulation signal PWM and the coupling circuit 340 and a fifth diode D5 having an anode electrode supplied with the driving voltage EVDD and a cathode electrode connected to the coupling circuit 340.

A touch power signal generation circuit according to the disclosure may comprise a driving control circuit 310 for controlling a driving current Id flowing through a driving voltage line DVL in a display panel 110 having a plurality of touch electrodes TE, a driving current supply circuit 320 supplying the driving current Id to a light emitting element ED disposed on the display panel 110 through the driving voltage line DVL, a base voltage supply circuit 330 supplying a pulse modulation signal PWM to a base voltage line EVSL, and a coupling circuit 340 controlling an electrical connection state between the driving voltage line DVL and the base voltage line EVSL. A touch power signal having the same phase and amplitude as a touch driving signal TDS applied to the plurality of touch electrodes TE may be applied to the driving voltage line DVL and the base voltage line EVSL during a touch driving period TP.

It will be apparent to those skilled in the art that various modifications and variations can be made in the touch display device and the touch power signal generation circuit of the present disclosure without departing from the spirit or scope of the aspects. Thus, it is intended that the present disclosure covers the modifications and variations of the aspects provided they come within the scope of the appended claims and their equivalents.

What is claimed:

1. A touch display device, comprising:
a display panel including a driving voltage line and a base voltage line for driving a light emitting element and a touch electrode;
a touch circuit configured to apply a touch driving signal to the touch electrode and detect a touch according to a change in capacitance; and
a touch power signal generation circuit configured to apply a touch power signal having a same phase and amplitude as the touch driving signal to the driving voltage line and the base voltage line during a touch driving period,
wherein the touch power signal generation circuit includes:
a driving control circuit configured to control a driving current flowing through the driving voltage line;
a driving current supply circuit configured to supply the driving current to the light emitting element through the driving voltage line;
a base voltage supply circuit configured to supply a pulse modulation signal to the base voltage line; and coupling circuit configured to control an electrical coupling state between the driving voltage line and the base voltage line.

2. The touch display device of claim 1, wherein the touch electrode is electrically connected to the base voltage line.

3. The touch display device of claim 2, wherein the touch driving signal includes a pulse-modulated signal of a base voltage supplied to the base voltage line.

4. The touch display device of claim 1, wherein the touch power signal includes a pulse-modulated driving voltage and a pulse-modulated base voltage applied to the driving voltage line and the base voltage line respectively, during the touch driving period.

5. The touch display device of claim 1, wherein the touch power signal generation circuit is disposed a touch power integrated circuit configured to generate the touch driving signal or a power management integrated circuit configured to generate a driving voltage supplied to the driving voltage line.

6. The touch display device of claim 1, wherein the driving control circuit includes:
a first transistor having a source electrode connected to a ground and receiving a touch synchronization signal through a gate electrode;
a plurality of branch resistors connected between a drain electrode of the first transistor and the driving voltage line; and
a pumping capacitor connected between a branch node between the plurality of branch resistors and the driving current supply circuit.

7. The touch display device of claim 6, wherein the touch synchronization signal is varied into a first level turning on a transistor constituting the driving current supply circuit during a display driving period.

8. The touch display device of claim 7, wherein the pulse modulation signal is varied into a second level turning off the transistor constituting the driving current supply circuit during a touch driving period.

9. The touch display device of claim 8, wherein the second level is smaller than the first level.

10. The touch display device of claim 1, wherein the driving control circuit includes a resistor transferring a touch synchronization signal to the driving current supply circuit.

11. The touch display device of claim 1, wherein the driving current supply circuit includes:
a second transistor having a drain electrode supplied with the driving voltage, a gate electrode connected to the driving control circuit, and a source electrode connected to the driving voltage line;
a first diode having an anode electrode supplied with the driving voltage and a cathode electrode connected to the gate electrode of the second transistor; and
a second diode having an anode electrode supplied with the driving voltage and a cathode electrode connected to the driving voltage line.

12. The touch display device of claim 1, wherein the base voltage supply circuit includes an amplifier receiving the pulse modulation signal through a non-inverting input terminal and having an inverting input terminal and an output terminal connected to the base voltage line.

13. The touch display device of claim 1, wherein the coupling circuit includes at least one coupling capacitor connected between the driving voltage line and the base voltage line.

14. The touch display device of claim 1, wherein the touch power signal generation circuit further includes an overvoltage prevention circuit connected between the driving voltage line and the base voltage line.

15. The touch display device of claim 14, wherein the overvoltage prevention circuit includes:
a third diode having an anode electrode connected to a ground and a cathode electrode connected to the driving voltage line; and
a fourth diode having an anode electrode connected to the ground and a cathode electrode connected to the base voltage line.

16. The touch display device of claim 1, wherein the touch power signal generation circuit further includes a clamping circuit configured to maintain a voltage across both ends of the coupling circuit at the same level during a display driving period.

17. The touch display device of claim 16, wherein the clamping circuit includes:
a capacitor connected between the pulse modulation signal and the coupling circuit; and
a fifth diode having an anode electrode supplied with the driving voltage and a cathode electrode connected to the coupling circuit.

18. The touch display device of claim 1, wherein the display panel further includes a plurality of subpixels, each of which comprises the light emitting element and a driving transistor for driving the light emitting element, and
wherein the driving voltage line is connected to a source electrode of the driving transistor, and the base voltage line is connected to a common electrode of the light emitting element.

19. A touch power signal generation circuit, comprising:
a driving control circuit configured to control a driving current flowing through a driving voltage line in a display panel having a touch electrode;
a driving current supply circuit configured to supply the driving current to a light emitting element disposed on the display panel through the driving voltage line;
a base voltage supply circuit configured to supply a pulse modulation signal to a base voltage line; and
a coupling circuit configured to control an electrical connection state between the driving voltage line and the base voltage line,
wherein a touch power signal having the same phase and amplitude as a touch driving signal applied to the touch electrode is applied to the driving voltage line and the base voltage line during a touch driving period.

* * * * *